US009609341B1

(12) United States Patent
Gu et al.

(10) Patent No.: US 9,609,341 B1
(45) Date of Patent: Mar. 28, 2017

(54) VIDEO DATA ENCODING AND DECODING USING REFERENCE PICTURE LISTS

(71) Applicant: Google Inc., Mountain View, CA (US)

(72) Inventors: Qunshan Gu, Hayward, CA (US); Marco Paniconi, Campbell, CA (US)

(73) Assignee: GOOGLE INC., Mountain View, CA (US)

( * ) Notice: Subject to any disclaimer, the term of this patent is extended or adjusted under 35 U.S.C. 154(b) by 929 days.

(21) Appl. No.: 13/865,250

(22) Filed: Apr. 18, 2013

Related U.S. Application Data

(60) Provisional application No. 61/636,946, filed on Apr. 23, 2012.

(51) Int. Cl.
*H04N 19/46* (2014.01)
*H04N 19/91* (2014.01)

(52) U.S. Cl.
CPC ............ *H04N 19/46* (2014.11); *H04N 19/91* (2014.11)

(58) Field of Classification Search
None
See application file for complete search history.

(56) References Cited

U.S. PATENT DOCUMENTS

| | | |
|---|---|---|
| 4,816,906 A | 3/1989 | Kummerfeldt et al. |
| 4,924,310 A | 5/1990 | von Brandt |
| 5,148,269 A | 9/1992 | de Haan et al. |
| 5,337,086 A | 8/1994 | Fujinami |
| 5,371,841 A | 12/1994 | Jones |
| 5,389,068 A | 2/1995 | Keck |
| 5,398,068 A | 3/1995 | Liu et al. |

(Continued)

FOREIGN PATENT DOCUMENTS

| | | |
|---|---|---|
| EP | 0634873 | 1/1995 |
| EP | 1351510 | 10/2003 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Dave Czekaj
*Assistant Examiner* — Tyler W Sullivan
(74) *Attorney, Agent, or Firm* — Young Basile Hanlon & MacFarlane, P.C.

(57) ABSTRACT

Encoding and decoding is accomplished herein using a reference picture list. Reference frames are identified with picture numbers and are assigned to reference picture buffers when used for encoding. The picture numbers associated the reference frames in the reference picture buffers are ranked. Reordering can occur to assign short word lengths to those reference frames used frequently for prediction. The resulting encoded reference picture list is sent to a decoder. The decoder decodes the reference picture list. By comparing picture numbers in the reference picture list with picture numbers of reference picture buffers of the decoder, the encoder and decoder buffers can remain in sync even under packet loss conditions. For example, the decoder can use the decoded reference picture list to determine missing and unused reference frames.

7 Claims, 8 Drawing Sheets

(56) References Cited

U.S. PATENT DOCUMENTS

| | | |
|---|---|---|
| 5,442,458 A | 8/1995 | Rabbani et al. |
| 5,461,423 A | 10/1995 | Tsukagoshi |
| 5,483,287 A | 1/1996 | Siracusa |
| 5,485,279 A | 1/1996 | Yonemitsu et al. |
| 5,512,952 A | 4/1996 | Iwamura |
| 5,568,200 A | 10/1996 | Pearlstein et al. |
| 5,576,767 A | 11/1996 | Lee et al. |
| 5,586,285 A | 12/1996 | Hasbun et al. |
| 5,686,962 A | 11/1997 | Chung et al. |
| 5,717,394 A | 2/1998 | Schwartz et al. |
| 5,731,840 A | 3/1998 | Kikuchi et al. |
| 5,748,789 A | 5/1998 | Lee et al. |
| 5,767,909 A | 6/1998 | Jung |
| 5,818,536 A | 10/1998 | Morris et al. |
| 5,886,742 A | 3/1999 | Hibi et al. |
| 5,912,676 A | 6/1999 | Malladi et al. |
| 5,926,226 A | 7/1999 | Proctor et al. |
| 5,991,447 A | 11/1999 | Eifrig et al. |
| 5,999,641 A | 12/1999 | Miller et al. |
| 6,005,980 A | 12/1999 | Eifrig et al. |
| 6,075,875 A | 6/2000 | Gu |
| 6,084,912 A | 7/2000 | Reitmeier et al. |
| 6,108,383 A | 8/2000 | Miller et al. |
| 6,115,076 A | 9/2000 | Linzer |
| 6,181,822 B1 | 1/2001 | Miller et al. |
| 6,222,174 B1 | 4/2001 | Tullis et al. |
| 6,236,682 B1 | 5/2001 | Ota et al. |
| 6,272,179 B1 | 8/2001 | Kadono |
| 6,289,049 B1 | 9/2001 | Kim et al. |
| 6,292,837 B1 | 9/2001 | Miller et al. |
| 6,327,304 B1 | 12/2001 | Miller et al. |
| 6,359,929 B1 | 3/2002 | Boon |
| 6,370,267 B1 | 4/2002 | Miller et al. |
| 6,381,277 B1 | 4/2002 | Chun et al. |
| 6,473,463 B2 | 10/2002 | Agarwal |
| 6,560,366 B1 | 5/2003 | Wilkins |
| 6,658,618 B1 | 12/2003 | Gu et al. |
| 6,661,842 B1 | 12/2003 | Abousleman |
| 6,711,211 B1 | 3/2004 | Lainema |
| 6,735,249 B1 | 5/2004 | Karczewicz et al. |
| 6,774,924 B2 | 8/2004 | Kato et al. |
| 6,774,929 B1 | 8/2004 | Kopp |
| 6,909,749 B2 | 6/2005 | Yang et al. |
| 6,985,527 B2 | 1/2006 | Gunter et al. |
| 7,027,654 B1 | 4/2006 | Ameres et al. |
| 7,050,503 B2 | 5/2006 | Prakash et al. |
| 7,085,319 B2 | 8/2006 | Prakash et al. |
| 7,221,710 B2 | 5/2007 | Lee |
| 7,253,831 B2 | 8/2007 | Gu |
| 7,406,053 B2 | 7/2008 | Cheung et al. |
| 7,430,261 B2 | 9/2008 | Forest et al. |
| 7,499,492 B1 | 3/2009 | Ameres et al. |
| 7,529,199 B1 | 5/2009 | Wijnands et al. |
| 7,532,808 B2 | 5/2009 | Lainema |
| 7,606,310 B1 | 10/2009 | Ameres et al. |
| 7,671,894 B2 | 3/2010 | Yea et al. |
| 7,728,840 B2 | 6/2010 | Hung |
| 7,734,821 B2 | 6/2010 | Wang et al. |
| 7,773,677 B2 | 8/2010 | Lee |
| 7,974,233 B2 | 7/2011 | Banerjee |
| 8,005,137 B2 | 8/2011 | Han et al. |
| 8,111,752 B2 | 2/2012 | Kumar et al. |
| 8,284,846 B2 | 10/2012 | Lamy-Bergot et al. |
| 8,310,521 B2 | 11/2012 | Zhang et al. |
| 8,638,854 B1 | 1/2014 | Bankoski et al. |
| 8,681,863 B2 * | 3/2014 | Koo .................. H04N 19/597 375/240.12 |
| 9,014,266 B1 | 4/2015 | Gu et al. |
| 2001/0022815 A1 | 9/2001 | Agarwal |
| 2002/0031272 A1 | 3/2002 | Bagni et al. |
| 2002/0036705 A1 | 3/2002 | Lee et al. |
| 2002/0071485 A1 | 6/2002 | Caglar et al. |
| 2002/0118295 A1 | 8/2002 | Karczewicz et al. |
| 2002/0172289 A1 | 11/2002 | Akiyoshi et al. |
| 2003/0081850 A1 | 5/2003 | Karczewicz et al. |
| 2003/0123545 A1 | 7/2003 | Prakash et al. |
| 2003/0165331 A1 | 9/2003 | Van Der Schaar |
| 2003/0202594 A1 | 10/2003 | Lainema |
| 2003/0215014 A1 | 11/2003 | Koto et al. |
| 2004/0013308 A1 | 1/2004 | Jeon et al. |
| 2004/0037357 A1 | 2/2004 | Bagni et al. |
| 2004/0042549 A1 | 3/2004 | Huang et al. |
| 2004/0080669 A1 | 4/2004 | Nagai et al. |
| 2004/0184533 A1 | 9/2004 | Wang |
| 2004/0202252 A1 | 10/2004 | Lee |
| 2004/0228410 A1 | 11/2004 | Ameres et al. |
| 2005/0008240 A1 | 1/2005 | Banerji et al. |
| 2005/0031030 A1 | 2/2005 | Kadono et al. |
| 2005/0123056 A1 | 6/2005 | Wang et al. |
| 2005/0147167 A1 | 7/2005 | Dumitras et al. |
| 2005/0185045 A1 | 8/2005 | Kamariotis |
| 2005/0207490 A1 | 9/2005 | Wang et al. |
| 2005/0226321 A1 | 10/2005 | Chen |
| 2005/0259736 A1 | 11/2005 | Payson |
| 2005/0286629 A1 | 12/2005 | Dumitras et al. |
| 2006/0050149 A1 | 3/2006 | Lang et al. |
| 2006/0050695 A1 | 3/2006 | Wang |
| 2006/0062481 A1 | 3/2006 | Suvanto |
| 2006/0126734 A1 | 6/2006 | Wiegand et al. |
| 2006/0159174 A1 | 7/2006 | Chono |
| 2006/0198443 A1 | 9/2006 | Liang et al. |
| 2006/0285598 A1 | 12/2006 | Tulkki |
| 2007/0009034 A1 | 1/2007 | Tulkki |
| 2007/0019730 A1 | 1/2007 | Lee et al. |
| 2007/0092010 A1 | 4/2007 | Huang et al. |
| 2007/0109409 A1 | 5/2007 | Yea et al. |
| 2007/0130755 A1 | 6/2007 | Duquette et al. |
| 2007/0177665 A1 | 8/2007 | Zhou et al. |
| 2007/0199011 A1 | 8/2007 | Zhang et al. |
| 2007/0201559 A1 | 8/2007 | He |
| 2007/0206673 A1 * | 9/2007 | Cipolli .................. H04L 1/1607 375/240.1 |
| 2007/0211798 A1 | 9/2007 | Boyce et al. |
| 2007/0230563 A1 | 10/2007 | Tian et al. |
| 2008/0112486 A1 | 5/2008 | Takahashi et al. |
| 2008/0115185 A1 | 5/2008 | Qiu et al. |
| 2008/0130755 A1 | 6/2008 | Loukas et al. |
| 2008/0219351 A1 | 9/2008 | Kim et al. |
| 2008/0273599 A1 | 11/2008 | Park et al. |
| 2008/0317138 A1 | 12/2008 | Jia |
| 2009/0028247 A1 * | 1/2009 | Suh ........................ H04H 20/30 375/240.25 |
| 2009/0052531 A1 * | 2/2009 | Mulroy ................ H04N 19/132 375/240.12 |
| 2009/0103610 A1 | 4/2009 | Puri |
| 2009/0122859 A1 | 5/2009 | Yasuda |
| 2009/0147856 A1 | 6/2009 | Song et al. |
| 2009/0148058 A1 | 6/2009 | Dane et al. |
| 2009/0154563 A1 | 6/2009 | Hong et al. |
| 2009/0175330 A1 | 7/2009 | Chen et al. |
| 2009/0238269 A1 | 9/2009 | Pandit et al. |
| 2009/0238277 A1 | 9/2009 | Meehan |
| 2010/0061444 A1 | 3/2010 | Wilkins et al. |
| 2010/0061461 A1 | 3/2010 | Bankoski et al. |
| 2010/0061645 A1 | 3/2010 | Wilkins et al. |
| 2010/0086027 A1 | 4/2010 | Panchal et al. |
| 2010/0104016 A1 | 4/2010 | Aoki |
| 2010/0125768 A1 * | 5/2010 | Mauchly ................ H04L 1/1829 714/749 |
| 2010/0195721 A1 | 8/2010 | Wu et al. |
| 2010/0239015 A1 | 9/2010 | Wang et al. |
| 2011/0069751 A1 | 3/2011 | Budagavi |
| 2011/0090960 A1 | 4/2011 | Leontaris et al. |
| 2011/0164684 A1 | 7/2011 | Sato et al. |
| 2011/0268195 A1 * | 11/2011 | Shigenobu ........... H04N 19/597 375/240.25 |
| 2012/0063513 A1 | 3/2012 | Grange et al. |
| 2012/0092452 A1 | 4/2012 | Tourapis et al. |
| 2012/0189058 A1 * | 7/2012 | Chen .................... H04N 19/159 375/240.15 |
| 2012/0257677 A1 | 10/2012 | Bankoski et al. |
| 2012/0328005 A1 | 12/2012 | Yu et al. |
| 2013/0022099 A1 | 1/2013 | Liu et al. |
| 2013/0044817 A1 | 2/2013 | Bankoski et al. |

(56) References Cited

U.S. PATENT DOCUMENTS

| | | | | |
|---|---|---|---|---|
| 2013/0114695 | A1* | 5/2013 | Joshi | H04N 19/463 375/240.03 |
| 2013/0114742 | A1* | 5/2013 | Hannuksela | H04N 19/00533 375/240.25 |
| 2013/0242046 | A1* | 9/2013 | Zhang | H04N 13/0048 348/43 |
| 2013/0279589 | A1 | 10/2013 | Gu et al. | |
| 2013/0287108 | A1* | 10/2013 | Chen | H04N 19/597 375/240.16 |
| 2014/0169449 | A1* | 6/2014 | Samuelsson | H04N 19/00024 375/240.02 |

FOREIGN PATENT DOCUMENTS

| | | |
|---|---|---|
| EP | 1496706 | 1/2005 |
| GB | 2403618 | 1/2005 |
| JP | 8280032 | 10/1996 |
| JP | 11262018 | 9/1999 |
| JP | 11289544 | 10/1999 |
| JP | 11313332 | 11/1999 |
| JP | 11513205 | 11/1999 |
| KR | 100213018 | 8/1999 |
| KR | 20010030916 | 4/2001 |
| WO | WO0150770 | 7/2001 |
| WO | WO03026315 | 3/2003 |
| WO | WO03084235 | 10/2003 |
| WO | WO2006078115 | 7/2006 |
| WO | WO2008008331 | 1/2008 |
| WO | WO2011005624 | 1/2011 |
| WO | WO2012102973 | 8/2012 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, An Open Source Video Codec for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.
High efficiency video coding (HEVC) text specification draft 6, JCTVC-H1003, JCT-VC 7th meeting, Geneva, Switzerland, Nov. 21-30, 2011.
Athanasios, et al.,"Weighted prediction methods for improved motion compensation," Image Processing (ICIP), 2009 16th IEEE International Conference, Nov. 7, 2009, pp. 1029-1032.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Chong Soon Lim et al. Reference Lists for B Pictures Under Low Delay Constraints, 95. MPEG Meeting; Jan. 24, 2011; Jan. 21, 2011.
Ebrahimi, Touradj, et al.; "Joint motion estimation and segmentation for very low bitrate video coding", SPIE vol. 2501, 1995, 12 pp.
EP127356814 Search Report mailed Oct. 30, 2014.
Fang S et al.: "The Construction of Combined List for HEVC",6. JCT-VC Meeting; 97. MPEG Meeting; Jul. 14, 2011-Jul. 22, 2011;Torino;(Joint Collaborative Team on Video Coding of ISO/IEC JTC1/SC29/WG11 and ITU-T SG.16); URL:http://wftp3.itu.int/av-arch/jctvc-site/, No. JCTVC-F573. Jul. 16, 2011 (Jul. 16, 2011).
Guillotel, Philippe, et al.; "Comparison of motion vector coding techniques", SPIE vol. 2308, 1994, 11 pp.
IPRP for PCT/US2013/037058 from related application mailed Nov. 6, 2014.
ISR & Written Opinion, Re: Application # PCT/US2012/043748;Sep. 14, 2012.
ISR and Written Opinion for International Patent Application PCT/US2012/031579; dated Jun. 21, 2012.
ISR for related matter PCT/US2013/037058 mailed Dec. 16, 2013.
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
ON2 Technologies Inc., White Paper TrueMotion VP7 Video Codec, Jan. 10, 2005, 13 pages, Document Version: 1.0, Clifton Park, New York.

(56) References Cited

OTHER PUBLICATIONS

Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Wang et al.,On reference picture list construction for uni-predicted partitions, JCT-VC Meeting, JCTVCE348, MPEG Meeting, Geneva, Mar. 11, 2011.
Wiegand, Thomas, et al.; Long-Term Memory Motion-Compensated Prediction, date unknown.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wright, R. Glenn, et al.; "Multimedia—Electronic Technical Manual for ATE", IEEE 1996, 3 pp.
Zhang, Kui, et al.; "Variable Block Size Video Coding With Motion Prediction and Motion Segmentation", SPIE vol. 2419, 1995, 9 pp.
Zhi Liu, Zhaoyang Zhang, Liquan Shen, Mosaic Generation in H.264 Compressed Domain, IEEE 2006.
Bo Hong: "Introduction to H.264", Internet citation, XP002952898, pp. 5, 14-15, Nov. 22, 2002.
Borman S. et al., "Super-Resolution From Image Sequences—A Review", Proceedings of Midwest Symposium on Circuits and Systems, pp. 374-378, Aug. 9, 1998.
Carreira, Joao et al. "Constrained Parametric Min-Cuts for Automatic Object Segmentation", 2010 IEEE Conference on Computer Vision and Pattern Recognition (CVPR), San Francisco, CA, Jun. 13-18, 2010.
Feng Wu et al, "Efficient Background Video Coding with Static Sprite Generation and Arbitrary-Shape Spatial Prediction Techniques", IEEE Transactions on Circuits and Systems for Video Technology, vol. 13, No. 5, pp. 394-405, May 1, 2003.
Girod B. et al., "3-D Image Models and Compression: Synthetic Hybrid or Natural Fit?", International Conference on Image Processing, vol. 2, pp. 525-529, Oct. 24, 1999.
Hendry et al., "AHG21: Explicit Reference Pictures Signaling with Output Latency Count Scheme", 7 JCT-VC Meeting; 98 MPEG Meeting Nov. 21, 2011-Nov. 30, 2011; Geneva.
Hiroshi Watanabe et al, "Sprite Coding in Object-Based Video Coding Standard: MPEG-4", Proceedings of Multiconference on Systemics, Cybernetics and Informatics, vol. 13, pp. 420-425, Jul. 1, 2001.
International Search Report and Written opinion, from related matter, International Application No. PCT/US2009/056448.
Irani M et al, "Video Compression Using Mosaic Representations", Signal Processing Image Communication, vol. 7 No. 4., pp. 529-552, Nov. 1, 1995.
"Liu, P., et al, ""A fast and novel intra and inter modes decision prediction algorithm for H.264/AVC based-on the characteristics of* u macro-block""", 2009 Fifth Inti. Confr. on Intelligent Information Hiding and Multimedia Signal Processing, pp. 286-289,http:/ /i eeexp lore. ieee .o rg/s tamp/stamp .jsp ?tp=&arn umber =533 7 483".
On2 Technologies, Inc., White Paper On2's TrueMotion VP7 Video Codec, Jul. 11, 2008, pp. 7 pages, Document Version:1.0, Clifton Park, New York.
On2 Technologies, Inc., White Paper On2's TrueMotion VP7 Video Codec,Jan. 10, 2005, pp. 13 pages, Document Version:1.0, Clifton Park, New York.
Park, Jun Sung, et al., "Selective Intra Prediction Mode Decision for H.264/AVC Encoders", World Academy of Science, Engineering and Technology 13, (2006).
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Sjoberg R. et al/ "Absolute signaling of refrence pictures", 6 JCT-VC Meeting; 97. MPEG Meeting; Jul. 14, 2011-Jul. 22, 2011; Torinino (Joint Collaborative Team on Video Coding of ISO/*EC JTC1/Sc29/WG11 and ITU-T SG. 16).
Written Opinion of the International Searching Authority dated Aug. 8, 2010, from the corresponding International Application No. PCT/US2009/056448 filed Sep. 10, 2009.

* cited by examiner 1
0 1 x0
0 0 1 x1 x0
0 0 0 1 x2 x1 x0
0 0 0 0 1 x3 x2 x1 x0
0 0 0 0 0 1 x4 x3 x2 x1 x0
•
•
•

FIG. 9

| BIT STRING | CODE NUMBER |
|---|---|
| 1 | 0 |
| 010 | 1 |
| 011 | 2 |
| 00100 | 3 |
| 00101 | 4 |
| 00110 | 5 |
| 00111 | 6 |
| 0001000 | 7 |
| 0001001 | 8 |
| 0001010 | 9 |
| • | • |
| • | • |
| • | • |

VIDEO DATA ENCODING AND DECODING USING REFERENCE PICTURE LISTS

CROSS-REFERENCE TO RELATED APPLICATION

This application claims priority to U.S. Provisional Application No. 61/636,946, filed Apr. 23, 2012, which is incorporated herein in its entirety by reference. This application is related to a concurrently-filed application entitled "Managing Multi-Reference Picture Buffers for Video Data Coding," having Ser. No. 13/865,241.

TECHNICAL FIELD

This disclosure relates to encoding and decoding visual data, such as video stream data, for transmission or storage.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video with smooth playback.

Digital video streams typically represent video using a sequence of frames. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Certain of these techniques use reference frames or portions of reference frames to generate differences between the reference and the frame being encoded. The differences can generally be encoded with fewer bits than the original frame.

BRIEF SUMMARY

Disclosed herein are aspects of systems, methods and apparatuses for encoding a video stream having a plurality of frames and/or decoding an encoded video stream having a plurality of frames using reference picture lists. One encoding method includes assigning a respective picture number to each of a plurality of reference frames used to encode at least one of the plurality of frames, assigning the plurality of reference frames to reference picture buffers, identifying a reference picture list including picture numbers of the plurality of reference frames, ranking the picture numbers included in the reference picture list from smallest to largest or from largest to smallest, and encoding the reference picture list into a bitstream by encoding the picture numbers into the bitstream in an order determined by the ranking.

Another aspect of the disclosed implementations is a method for decoding an encoded video stream. The method includes receiving the encoded video stream, the encoded video stream including a reference picture list, decoding the reference picture list to obtain first picture numbers included in the reference picture list, each first picture number assigned to a respective reference frame, identifying second picture numbers assigned to reference frames of reference picture buffers, and comparing the first picture numbers with the second picture numbers. If a picture number is included in the first picture numbers and not included in the second picture numbers, the method can include identifying a reference frame to which the picture number was assigned as missing. If a picture number is included in the second picture numbers and not included in the first picture numbers, the method can include identifying a reference buffer that includes a reference frame to which the picture number was assigned as unused for reference. The method can further include decoding a frame of the plurality of frames using at least one reference frame identified in the reference picture list.

Variations in these and other aspects are described in additional detail below.

BRIEF DESCRIPTION OF THE DRAWINGS

The description herein makes reference to the accompanying drawings wherein like reference numerals refer to like parts throughout the several views, and wherein:

FIG. 9 is an example of an Exp-Golomb code tree; and

FIG. 10 is an example of an Exp-Golomb code tree used to represent a number series in increasing order.

DETAILED DESCRIPTION

To permit transmission of digital video streams while limiting bandwidth consumption, video encoding and decoding schemes incorporate various compression formats. These digital video encoder/decoder formats, also called codecs, can be implemented using hardware and/or software programs executing from memory included in a computing device or devices.

Existing codecs can employ reference frames to permit video streams to maintain video quality while reducing bandwidth requirements. Reference frames can be used by an encoder to encode some frames of the video stream using a reduced number of bits to represent the residuals or differences between the blocks of the frame and blocks of the reference frame or frames. This is sometimes called inter-frame motion prediction. A number of reference frames can be temporarily stored or buffered in memory at the encoder or decoder during encoding or decoding. The encoder can assign numbers or symbols to the reference frame(s) to indicate which reference frame can be used to encode which frame to permit the decoder to correctly decode the frames of the video stream.

The teachings herein provide techniques for constructing, signaling and optionally reordering a picture list of reference frames. The terms reference frame and reference picture are used interchangeably herein, and they may represent only a portion of a frame. Reference pictures are assigned unique picture numbers. By doing so, a picture list can be constructed and signaled using a rank-order algorithm with differential coding of variable-length code, for example. When reordering is conducted, it can be done using the index of the picture list, which can be signaled by a relatively short code word. An implementation of the teachings herein can be relatively straightforward and can save overhead bits used to maintain encoder and decoder buffers in sync even under packet loss conditions. Details of certain aspects are described herein initially with reference to the environments in which they can be implemented.

Figure 1:
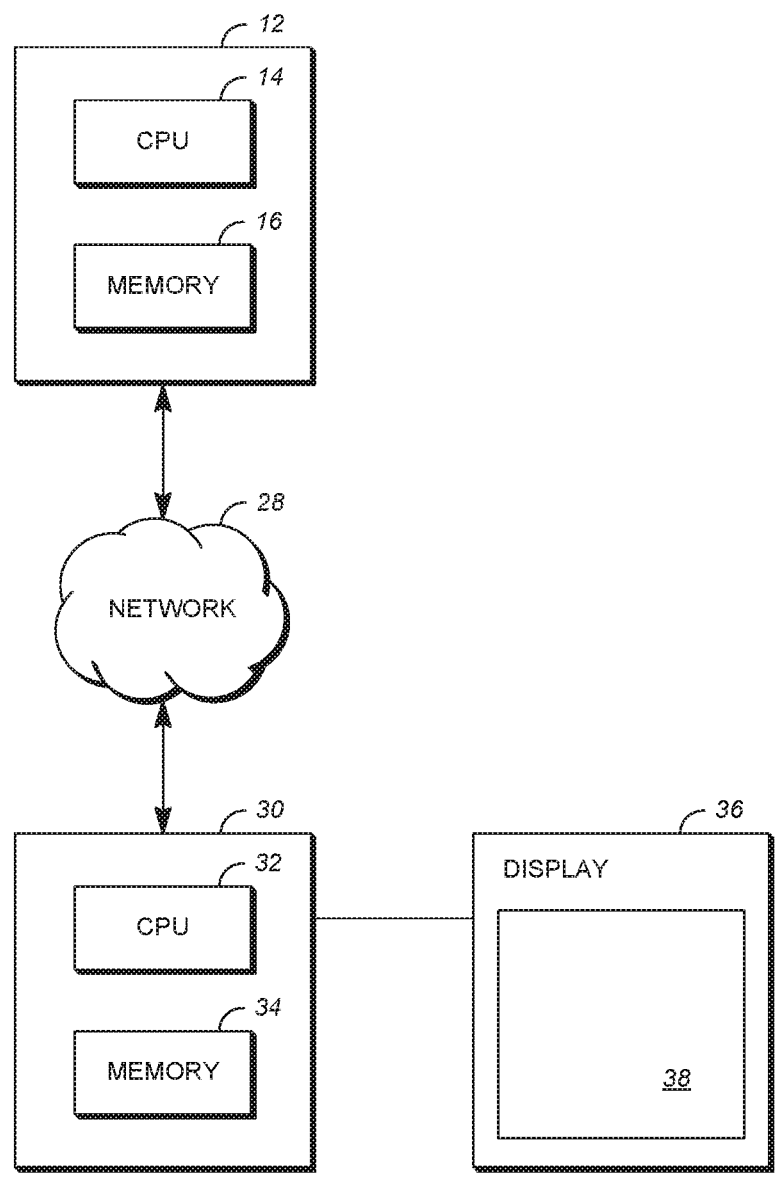
FIG. 1 is a schematic diagram of a video encoding and decoding system.

FIG. 1 is a schematic of a video encoding and decoding system 10. An exemplary transmitting station 12 can be, for example, a computer having an internal configuration of hardware including a processor such as a central processing unit (CPU) 14 and a memory 16. CPU 14 is a controller for controlling the operations of transmitting station 12. CPU 14 is connected to memory 16 by, for example, a memory bus. Memory 16 can be read only memory (ROM), random access memory (RAM) or any other suitable memory device. Memory 16 can store data and program instructions that are used by CPU 14. Other suitable implementations of transmitting station 12 are possible. For example, the processing of transmitting station 12 can be distributed among multiple devices.

A network 28 connects transmitting station 12 and a receiving station 30 for encoding and decoding of the video stream. Specifically, the video stream can be encoded in transmitting station 12 and the encoded video stream can be decoded in receiving station 30. Network 28 can be, for example, the Internet. Network 28 can also be a local area network (LAN), wide area network (WAN), virtual private network (VPN), a cellular telephone network or any other means of transferring the video stream from transmitting station 12 to, in this example, receiving station 30.

Receiving station 30, in one example, can be a computer having an internal configuration of hardware including a processor such as a CPU 32 and a memory 34. CPU 32 is a controller for controlling the operations of receiving station 30. CPU 32 is connected to memory 34 by, for example, a memory bus. Memory 34 can be ROM, RAM or any other suitable memory device. Memory 34 can store data and program instructions that are used by CPU 32. Other suitable implementations of receiving station 30 are possible. For example, the processing of receiving station 30 can be distributed among multiple devices.

A display 36 configured to display a video stream can be connected to receiving station 30. Display 36 can be implemented in various ways, including by a liquid crystal display (LCD), a cathode-ray tube (CRT), or a light emitting diode display (LED), such as an OLED display. Display 36 is coupled to CPU 32 and can be configured to display a rendering 38 of the video stream decoded by a decoder in receiving station 30.

Other implementations of encoder and decoder system 10 are possible. In some of the implementations described, for example, an encoder is in transmitting station 12 and a decoder is in receiving station 30 as instructions in memory or a component separate from memory. However, an encoder or decoder can be coupled to a respective station 12, 30 rather than in it. Further, one implementation can omit network 28 and/or display 36. In another implementation, a video stream can be encoded and then stored for transmission at a later time to receiving station 30 or any other device having memory. In one implementation, a video stream is received by the receiving station 30 (e.g., via network 28, a computer bus, and/or some communication pathway) and stored for later decoding. In another implementation, additional components can be added to encoder and decoder system 10. For example, a display or a video camera can be attached to transmitting station 12 to capture the video stream to be encoded. In an exemplary implementation, a real-time transport protocol (RTP) is used for transmission of the encoded video. In another implementation, a transport protocol other than RTP may be used, e.g., an HTTP-based video streaming protocol.

Figure 2:
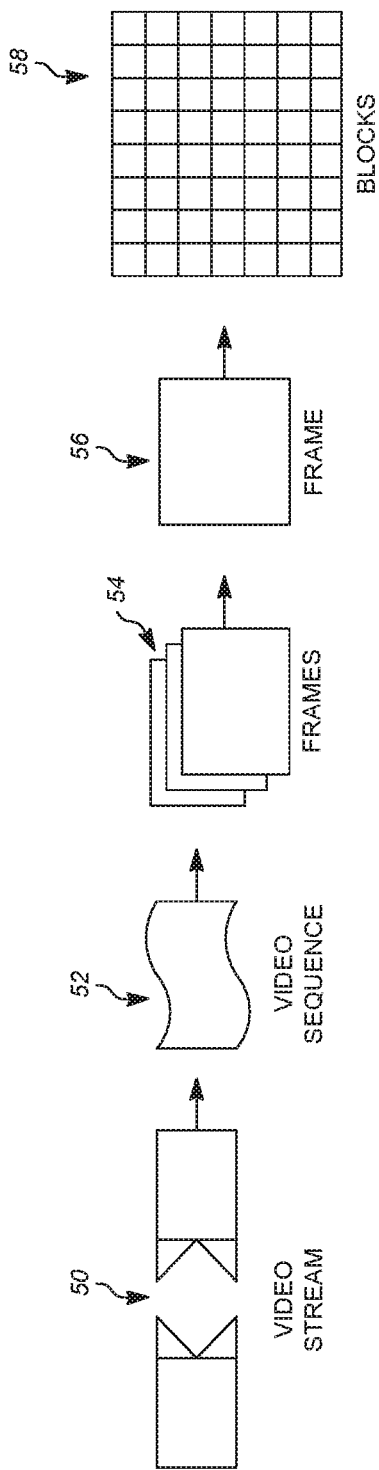
FIG. 2 is a diagram of a typical video stream to be encoded and decoded.

FIG. 2 is a diagram of a typical video stream 50 to be encoded and subsequently decoded. Video stream 50 includes a video sequence 52. At the next level, video sequence 52 includes a number of adjacent frames 54. While three frames are depicted as adjacent frames 54, video sequence 52 can include any number of adjacent frames. Adjacent frames 54 can then be further subdivided into individual frames, e.g., a single frame 56. At the next level, single frame 56 can be divided into a series of blocks 58, which can contain data corresponding to, for example, 16×16 pixels in frame 56. Each block 58 can contain luminance and chrominance data for the corresponding pixels. Blocks 58 can also be of any other suitable size such as 16×8 pixel groups or 8×16 pixel groups and can be further subdivided into smaller blocks depending on the application. Unless otherwise noted, the terms block and macroblock are used interchangeably herein.

Figure 3:
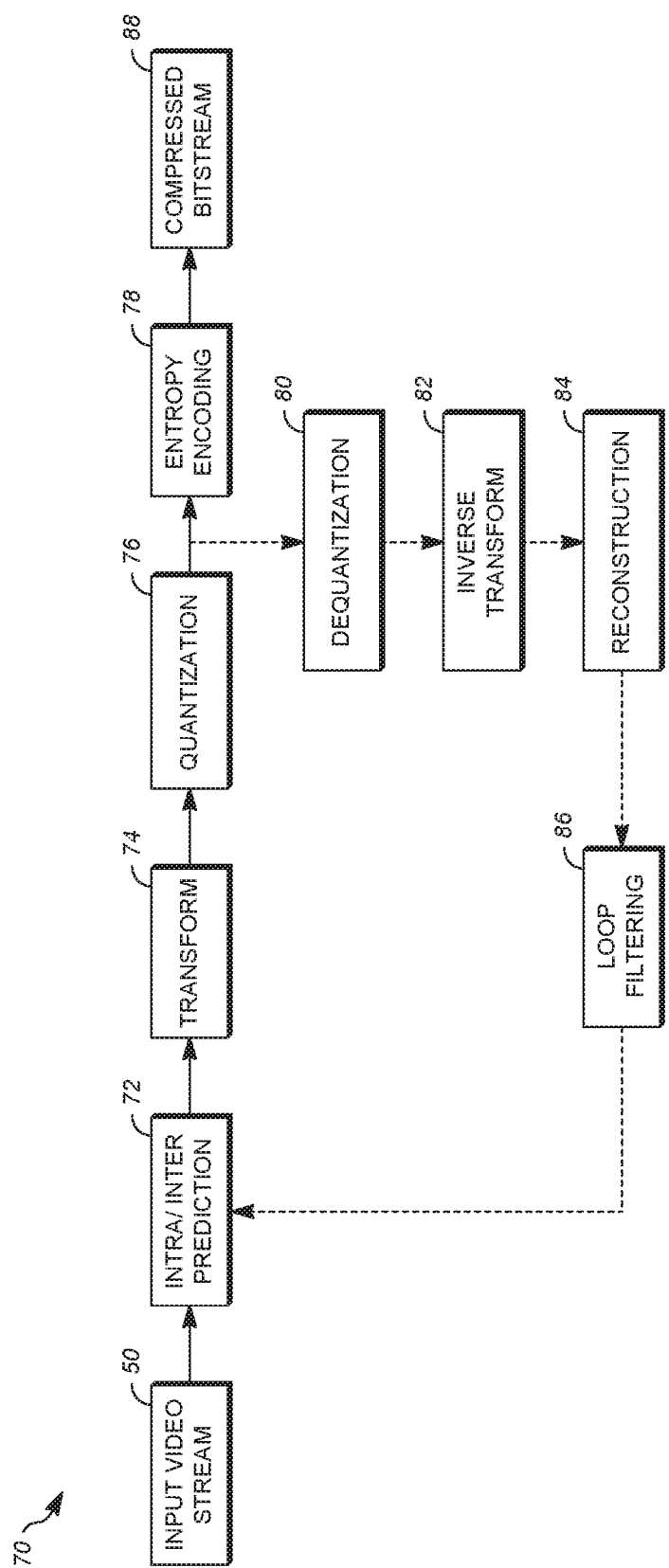
FIG. 3 is a block diagram of a video encoder in accordance with an implementation.

FIG. 3 is a block diagram of a video encoder 70 in accordance with an implementation. Encoder 70 can be implemented, as described above, in transmitting station 12 such as by providing a computer software program stored in memory 16, for example. The computer software program can include machine instructions that, when executed by CPU 14, cause transmitting station 12 to encode video data in the manner described in FIG. 3. Encoder 70 can also be implemented as specialized hardware included, for example, in transmitting station 12. Encoder 70 has the following stages to perform the various functions in a forward path (shown by the solid connection lines) to produce an encoded or a compressed bitstream 88 using input video stream 50: an intra/inter prediction stage 72, a transform stage 74, a quantization stage 76, and an entropy encoding stage 78. Encoder 70 may also include a reconstruction path (shown by the dotted connection lines) to reconstruct a frame for prediction and encoding of future blocks. In FIG. 3, encoder 70 has the following stages to perform the various functions in the reconstruction path: a dequantization stage 80, an inverse transform stage 82, a reconstruction stage 84, and a loop filtering stage 86. Other structural variations of encoder 70 can be used to encode video stream 50.

When video stream 50 is presented for encoding, each frame 56 within video stream 50 is processed in units of blocks. At intra/inter prediction stage 72, each block can be encoded using either intra-frame prediction (within a single frame) or inter-frame prediction (from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at intra/inter prediction stage 72 to produce a residual block (residual). Transform stage 74 transforms the residual into transform coefficients in, for example, the frequency domain. Examples of block-based transforms include the Karhunen-Loève Transform (KLT), the Discrete Cosine Transform (DCT), the Singular Value Decomposition Transform (SVD) and the Asymmetric Discrete Sine Transform (ADST). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 76 converts the transform coefficients into discrete quantum values, which are referred to as quantized transform coefficients. The quantized transform coefficients are then entropy encoded by entropy encoding stage 78. The entropy-encoded coefficients, together with other information used to decode the block, which may include for example the type of prediction used, motion vectors and quantizer value, are then output to compressed bitstream 88. Compressed bitstream 88 can be formatted using various techniques, such as variable length encoding (VLC) and arithmetic coding. Compressed bitstream 88 can also be referred to as an encoded video stream and the terms will be used interchangeably herein.

The reconstruction path in FIG. 3 (shown by the dotted connection lines) can be used to ensure that both encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at inverse transform stage 82 to produce a derivative residual block (derivative residual). At reconstruction stage 84, the prediction block that was predicted at intra/inter prediction stage 72 can be added to the derivative residual to create a reconstructed block. Loop filtering stage 86 can be applied to the reconstructed block to reduce distortion such as blocking artifacts.

Other variations of encoder 70 can be used to encode compressed bitstream 88. For example, a non-transform based encoder 70 can quantize the residual signal directly without transform stage 74. In another implementation, encoder 70 can have quantization stage 76 and dequantization stage 80 combined into a single stage.

Figure 4:
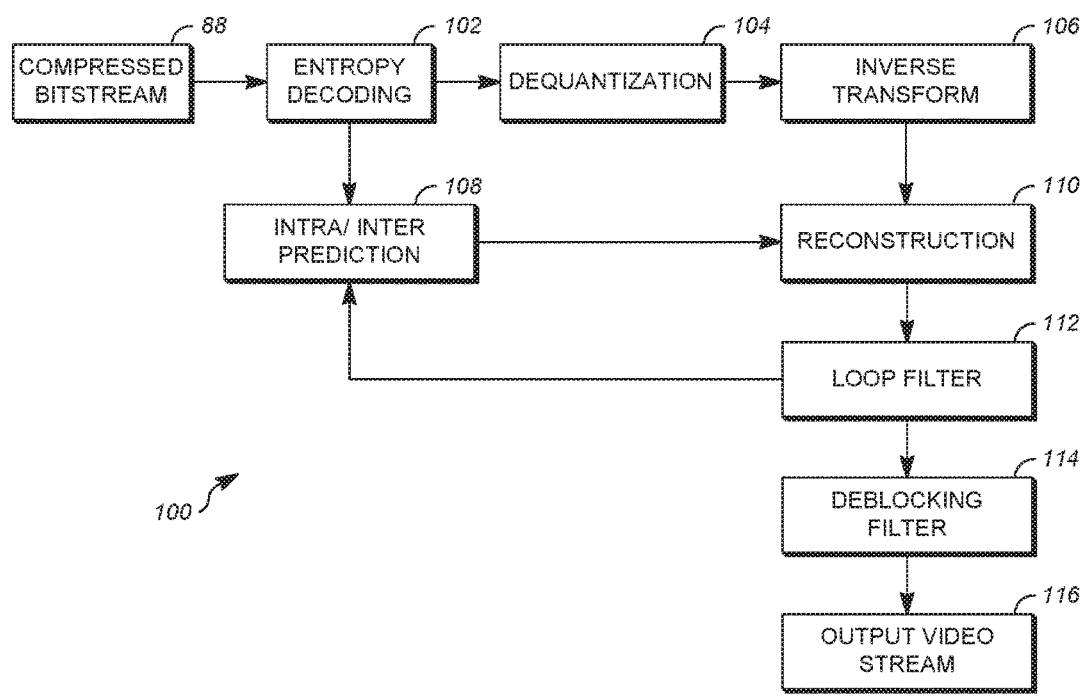
FIG. 4 is a block diagram of a video decoder in accordance with another implementation.

FIG. 4 is a block diagram of a video decoder 100 in accordance with another implementation of this disclosure. Decoder 100 can be implemented in receiving station 30, for example, by providing a computer software program stored in memory 34. The computer software program can include machine instructions that, when executed by CPU 32, cause receiving station 30 to decode video data in the manner described in FIG. 4. Decoder 100 can also be implemented as specialized hardware included, for example, in transmitting station 12 or receiving station 30.

Decoder 100, similar to the reconstruction path of encoder 70 discussed above, includes in one example the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 to produce a set of quantized transform coefficients. Dequantization stage 104 dequantizes the quantized transform coefficients, and inverse transform stage 106 inverse transforms the dequantized transform coefficients to produce a derivative residual that can be identical to that created by inverse transform stage 82 in encoder 70. Using header information decoded from compressed bitstream 88, decoder 100 can use intra/inter prediction stage 108 to create the same prediction block as was created in encoder 70, e.g., at intra/inter prediction stage 72. At reconstruction stage 110, the prediction block can be added to the derivative residual to create a reconstructed block. Loop filtering stage 112 can be applied to the reconstructed block to reduce blocking artifacts. Deblocking filtering stage 114 can be applied to the reconstructed block to reduce blocking distortion, and the result is output as output video stream 116. Output video stream 116 can also be referred to as a decoded video stream, and these terms will be used interchangeably herein.

Other variations of decoder 100 can be used to decode compressed bitstream 88. For example, decoder 100 can produce output video stream 116 without deblocking filtering stage 114.

Figure 5:
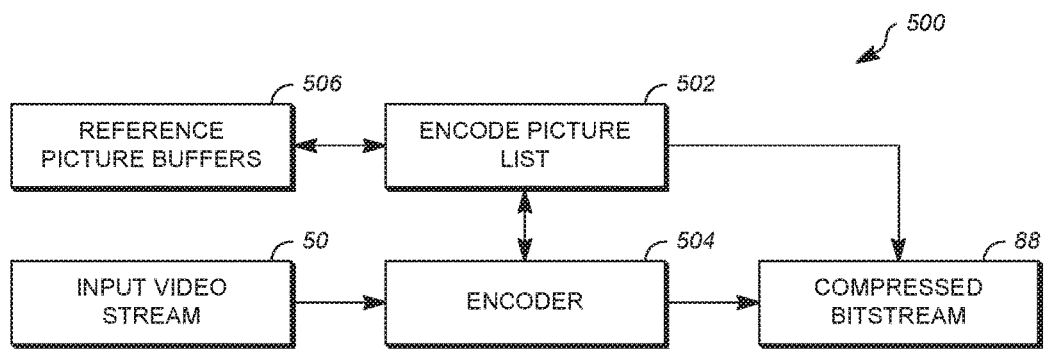
FIG. 5 is a block diagram of a modified video encoder illustrating encoding of an input video stream using multiple reference pictures through a reference picture list in accordance with an embodiment.

FIG. 5 is a block diagram of a modified video encoder 500 illustrating encoding of an input video stream using multiple reference pictures through a reference picture list in accordance with an implementation. Encoder 500 can be implemented as a software program using a computing device such as transmitting station 12, for example. The software program can be stored in memory 16 and can include instructions that, when executed by CPU 14, perform encoding steps described below. Encoder 500 can also be implemented as specialized hardware included, for example, in transmitting station 12. Encoder 500 has the following components to perform various functions to produce encoded or compressed bitstream 88 using input video stream 50: an encode picture list component 502, an encoder component 504 and reference picture buffers 506. Encoder component 504 performs processing as described for encoder 70 in FIG. 3 above, accepting as input a video stream 50 and outputting compressed bitstream 88. Encoder component 504 communicates with reference picture buffers 506 in cooperation with encode picture list component 502. Encoder component 504 can use the reference picture buffers 506 to temporarily store reference frames for use in inter-frame motion prediction at inter/intra prediction stage 72, for example.

Encode picture list component 502 manages reference picture buffers 506 and can keep track of which reference frames are currently being stored in which buffer in reference picture buffers 506, for example. Encode picture list component 502 constructs, reorders and encodes reference picture lists to be included in encoded video stream 88. Details of the construction, reordering and encoding of reference picture lists are described below. Reference picture buffers 506 and encode picture list component 502 can also be incorporated into existing stages/components of encoder 70, such as in inter/intra prediction stage 72.

Figure 6:
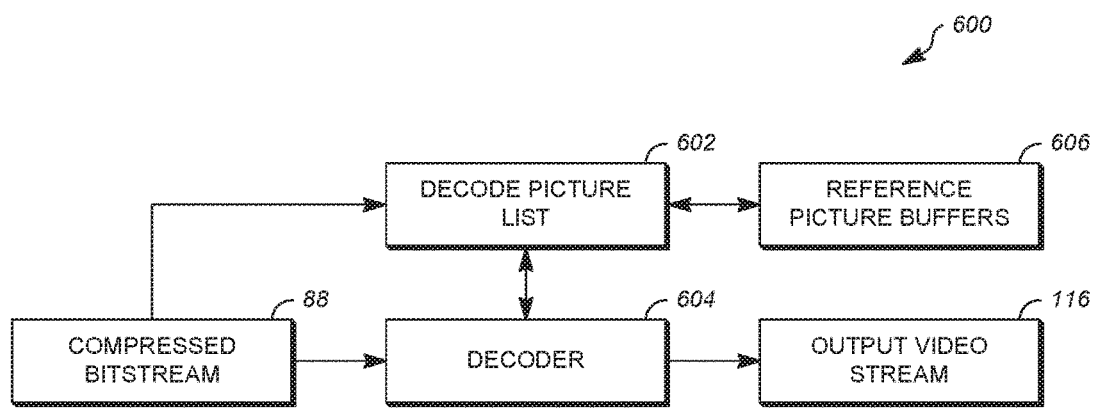
FIG. 6 is a block diagram of a modified video decoder illustrating decoding of a picture list.

FIG. 6 is a block diagram of a modified video decoder 600 illustrating decoding of a reference picture list in accordance with an implementation. Decoder 600 can be implemented as a software program using a computing device such as receiving station 30, for example. The software program can be stored in memory 34 and can include instructions that, when executed by CPU 32, perform decoding steps described below. Decoder 600 can also be implemented as specialized hardware included, for example, in receiving station 30. Decoder 600 has the following components to perform various functions to produce a decoded or output video stream 116 from compressed bitstream 88: a decode picture list component 602, a decoder component 604, and reference picture buffers 606. Decoder component 604 performs processing as described for decoder 100 in FIG. 4 above, accepting as input encoded video stream 88 and outputting an output video stream 116. Decoder component 604 communicates with reference picture buffers 606 in cooperation with decode picture list component 602. Decoder component 604 can use reference picture buffers 606 to temporarily store reference frames for use in inter-frame motion prediction using inter/intra prediction stage 108, for example.

Decode picture list component 602 can manage the reference picture buffers 606 and keep track of which reference frames are currently being stored in which buffer in reference picture buffers 606, for example. Decode picture list component 602 decodes and reorders reference picture lists included in encoded video stream 88. Details of the decoding and reordering of reference picture lists are given below. Reference picture buffers 606 and decode picture list component 602 can also be incorporated into existing stages/components of decoder 100, such as in inter/intra prediction stage 108.

Figure 7:
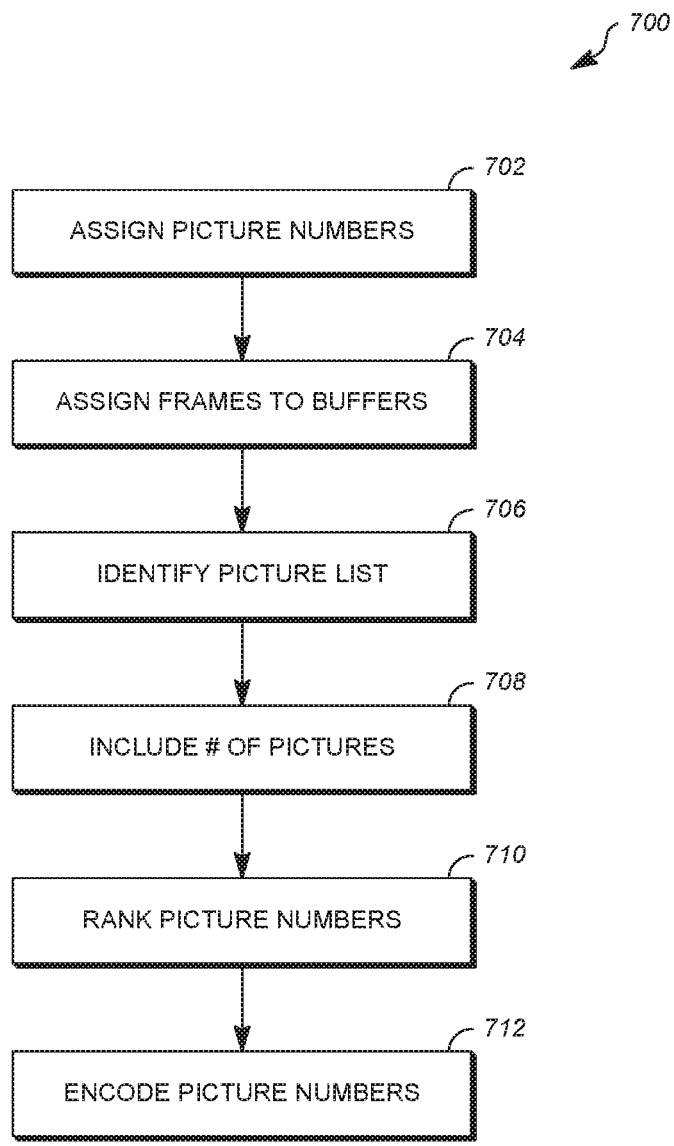
FIG. 7 is a flowchart diagram illustrating a process of encoding a reference picture list in accordance with an implementation.

FIG. 7 is a flowchart diagram illustrating a process 700 of encoding a reference picture list in accordance with an implementation. Process 700 can be implemented as a software program associated with encoder 500 using a computing device such as transmitting station 12, for example. The software program can be stored in memory 16 and can include instructions that, when executed by CPU 14, perform encoding steps described below. Process 700 can also be implemented as specialized hardware included, for example, in transmitting station 12. Process 700 can be implemented by the steps described below; however, the order in which the steps are performed may differ in different implementations and certain steps may occur concurrently. Further, steps may also be omitted, combined or added in certain implementations.

Process 700 employs a dedicated picture number (referred to herein as pic_id for convenience) as a unique identification for a reference frame in the reference picture buffers. A unique identification does not mean that the picture number is never used again. Instead, it means that the picture number for each reference frame can be unique within a certain amount of time or a certain number of pictures. For example, the picture numbers can be assigned cyclically, such as by re-using a picture number once the reference frame it was assigned to is no longer used for reference. At step 702, for example, each reference frame has a picture number assigned that is different from any picture number still active in the current reference picture buffers 506 (e.g., different from any picture number currently assigned to a reference frame currently stored in the reference picture buffers 506). As used herein the term "assign" means to store, indicate, connect, attach, impute, select or otherwise assign in any manner whatsoever. Reference frames can be generated and/or selected according to known encoding techniques, and the values of pic_id can be assigned randomly, sequentially or according to certain rules.

At step 704, a reference frame not yet stored to the reference picture buffers 506 can be stored to reference picture buffers 506. At step 706, the picture numbers pic_id of the reference frames included in reference picture buffers 506 are identified, and a reference picture list (herein referred to as pic_list[ ] for convenience) is constructed. The reference picture list can be used by a decoder to synchronize, for example, its reference buffers 606 to encoder reference buffers 505. The value of pic_list[i] is set to the pic_id of the ith picture number in reference picture buffers 506. Thus, pic_list[ ] is ranked. However, the index i does not need to be directly linked to the index of the reference picture buffers. The reference buffers in this example are simply buffers or memory locations which can be represented by a separate index. The pic_id value is used to represent the reference picture rather than the buffer in which the reference picture is stored. The pic_id values do not have to be assigned to the frames in cyclic order or in the display order of the coded pictures since they are based on the number of reference picture buffers 506 plus an amount based on a maximum expected number of lost frames. The terms "identify" and "set" as used herein means to select, construct, determine, specify or otherwise identify in any manner whatsoever. Reference picture buffers 506 not identified with a picture number pic_id can be marked as "unused for reference," and these buffers can be used to store reference frames for future encoding.

At step 708, a total number Nlist of picture numbers pic_id identified in step 706 can be included in the encoded video stream, e.g., as part of the encoded reference picture list pic_list[ ]. The number Nlist of picture numbers can be used by a decoder, such as decoder 604, to decode the remainder of reference picture list pic_list[ ] as described below. At step 710, reference picture list pic_list[ ] is ranked by picture number pic_id. Assuming Nlist is the number of reference pictures in the list, the picture numbers pic_id of the reference pictures range from pic_id[0] to pic_id[Nlist−1], where pic_id[i]<pic_id[i−1], e.g., the values of pic_id are ranked in increasing order. The values of pic_id could also be ranked in decreasing order. Reference picture list pic_list[ ] is then encoded in step 712 in association with each coded reference frame or picture.

In one example, reference picture list pic_list[ ] is initially encoded using a pulse code modulation (PCM) code by subtracting the immediately preceding values from the value and subtracting one:

pic_list[ ]=[pic_id[0],pic_id[1]−pic_id[0]−1, . . . ,pic_id[Nlist−2]−pic_id[Nlist−1]−1].

Each item in the pic_list_pcm[ ] can then be encoded into the bitstream using an unsigned Exp-Golomb code of order 1. FIG. 9 is an example of an Exp-Golomb code tree. In FIG. 9, the symbols xi, where i=0, 1, 2, 3 or 4, represent a binary number 0 or 1. All the unique values of the tree can be assigned to a list of numbers. For example, FIG. 10 is an example of an Exp-Golomb code tree used to represent a number series in increasing order. Accordingly, the encoded reference picture list pic_list[ ] can be included in an encoded video stream, such as in compressed bitstream 88.

The following is an example of a reference picture list pic_list[ ] constructed and signaled according to an exemplary embodiment. Assuming the word length of picture numbers pic_id is 4-bits, and there are currently six (6) reference frames used for reference in reference picture buffers 506 with pic_id values of 2, 4, 8, 9, 10 and 15, the pic_list[ ] would be:

pic_list[ ]=[2,4,8,9,10,15].

In one implementation, the reference buffers storing the six reference frames used for reference are marked as "used for reference," e.g., using a flag. PCM encoding of the pic_list[ ] can yield:

pic_list_pcm[ ]=[2,1,3,0,0,4].

Representing this list pic_list_pcm[ ] using an Exp-Golomb code results in the following bit string:

encoded_pic_list[ ]=[011,010,00100,1,1,00101].

According to this example, the number of bits to be used to transmit this reference picture list has been reduced from 24 bits (i.e., six numbers at four bits each) to 18 bits, a 25% savings.

The reference picture list pic_list[ ] can additionally be reordered for inter-frame motion prediction to further save bits by remapping more often used picture numbers pic_id. In other words, to represent the minimal code word-length capable of representing a reference picture, the corresponding pic_id values can be re-ordered (or remapped), e.g., for motion prediction purposes. For example, if pic_id=8 and pic_id=15 are two picture numbers that will be used for prediction of the pictures being coded, and pic_id=15 will be used more often in the prediction process, a short word length can be assigned to this picture number. The re-ordered pict_list[ ] can be represented as:

reorder_list[ ]=[15,8].

This picture list for prediction can be mapped to the indexes of pic_list[ ]. For example, pic_id=15 can be obtained from index 5 (i.e., pic_list[5]), while pic_id=8 can be obtained from index 2 (i.e., pic_list[2]).

In this implementation, the reordering syntax in the bitstream includes two elements: (1) the number of pictures to be reordered (reorder_length), and (2) the actual list of pic_list[ ] indexes, coded by fixed word-length code or variable length code such as Exp-Golomb code. In case the code word is fixed-length code, the length can be determined by the word length of Nlist (when represented by a fixed length binary code). For example, Nlist=6 can be represented by 110, therefore, the word-length of Nlist is 3. Due to this relationship, the encoder can avoid signaling the word-length of reorder_length in the bitstream.

Using this approach, the reordering of pic_id=15 and pic_id=8 can be represented by reorder_index[ ]=[5, 2] and can be coded in the bitstream in a fixed-length code as: 010 (reorder_length=2), 101 (reorder_index[0]=5) and 010 (reorder_index[1]=2). This can be added to the end of the encoded_pic_list[ ] yielding:

encoded_pic_list[ ]=[011,010,00100,1,1,00101,010, 101,010]

When reorder_length is coded by a variable length code such as Exp-Golomb code, it can be coded as 011.

Figure 8:
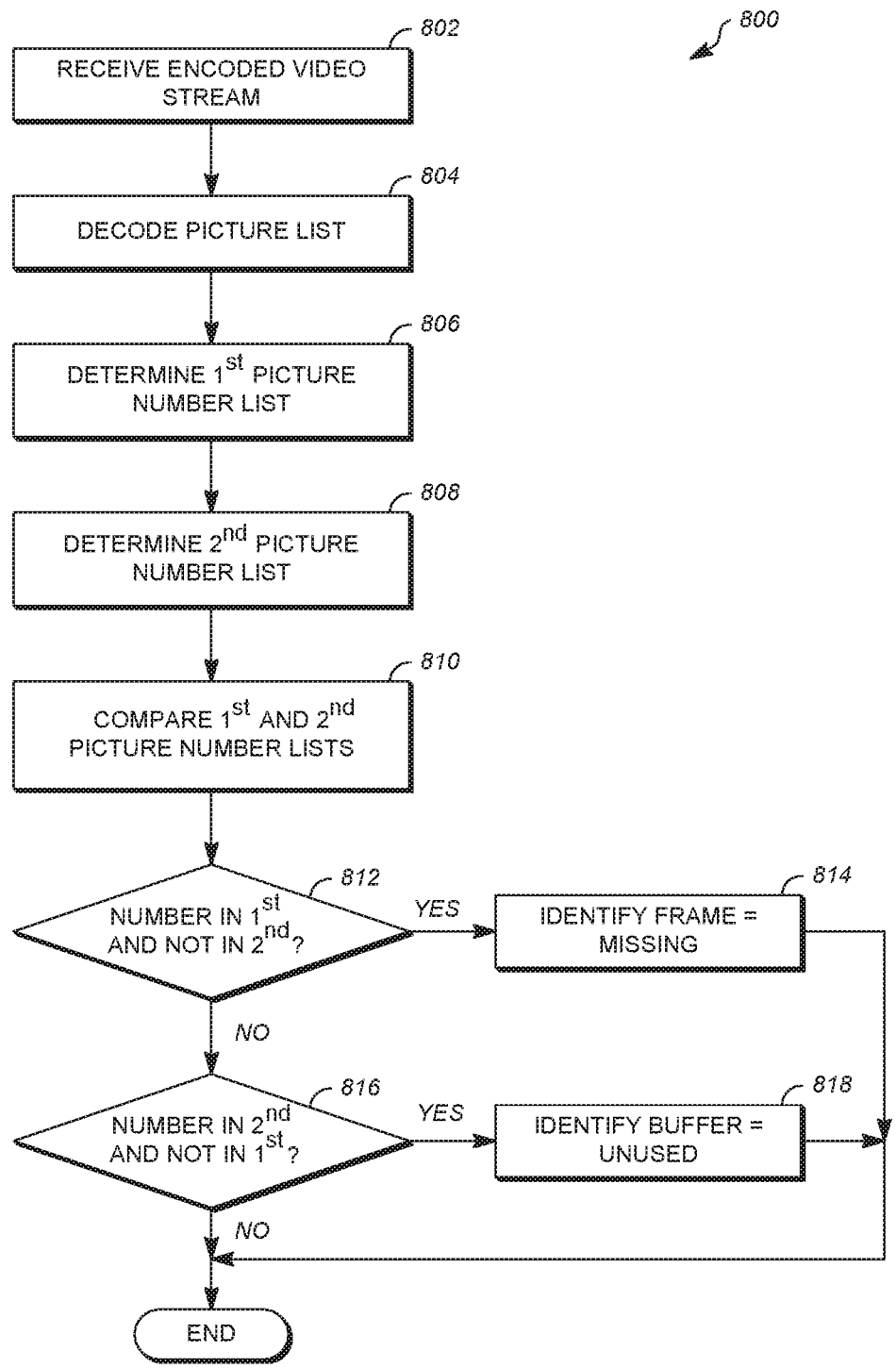
FIG. 8 is a flowchart diagram illustrating a process of decoding a reference picture list and synchronizing reference buffers in accordance with an implementation.

FIG. 8 is a flowchart diagram illustrating a process 800 of decoding a reference picture list and synchronizing reference buffers in accordance with an implementation. Process 800 can be implemented as a software program using a computing device such as receiving station 30, for example. The software program can be stored in memory 34 and can include instructions that, when executed by CPU 32, perform the decoding steps described below. Process 800 can also be implemented as specialized hardware included, for example, in receiving station 30. Process 800 can be implemented by the steps described below; however, the order in which the steps are performed may differ in different implementations and certain steps may occur concurrently. Further, steps may also be omitted, combined or added in certain embodiments.

At step 802, an encoded video stream such as compressed bitstream 88 can be received at a computing device, for example receiving station 30. Herein, received means to read the data from a network that could be wired or wireless, over a cable or by reading the video stream from memory, or from a storage device, including a disk drive or removable media such as a CompactFlash (CF) card, Secure Digital (SD) card, or the like. Compressed bitstream 88 in this example includes reference picture list pic_list[ ] encoded as described above with respect to FIG. 7.

At step 804, the decoder can decode a reference picture list from the received encoded video stream. The decoding process is the inverse of the encoding process, at least in part, and can be performed by decode picture list component 602 in conjunction with reference picture buffers 606. The decoding process can be applied to get the picture numbers (pic_ids) for multi-reference motion prediction, as well as get the picture list for reference buffer synchronization. Decoding the reference picture list includes, in this implementation, first decoding the encoded video stream to extract the number Nlist of picture numbers pic_id in the picture list pic_list[ ]. Then, the encoded video stream is decoded to extract the pulse code modulated pic_id list pic_list_pcm[ ]. If applicable, the encoded video stream is further decoded to extract reorder_length and the number of entries in the reorder_index[ ] list and to extract reorder_index[ ], the ordered indices of the most frequently used pic_ids in the pic_list_pcm[ ]. Next, pic_list[ ] is reconstructed from pic_list_pcm[ ] using the equations:

pic_list[0]=pic_list_pcm[0]; and pic_list[$i$]=pic_list_pcm[$i$]+pic_list[$i$-1]+1 for $i$=1 to Nlist-1.

When pic_list[ ] has additionally been reordered by remapping more often used picture numbers pic_id, reorder_list[ ] can be reconstructed from reorder_index[ ] and pic_list[ ] by, for example, processing according to:

reorder_list[$i$]=pic_list[reorder_index[$i$] for $i$=0 to reorder_length-1.

After the picture number list sent by the encoder is decoded, it can be used for synchronization with the reference buffer at the decoder by comparing that list with a list of picture numbers received in the decoder. For example, the first picture number list is determined at step 806. This is simply pic_list[ ]. At step 808, the second picture number list is determined by examining reference picture buffers 606 associated with decoder 604 and determining the picture numbers associated with in-use picture buffers. At step 810, the two lists are compared to determine if there are picture numbers in either list that are not in the other list. At step 812, if there are picture numbers in the first list that are not in the second list, the branch to step 814 is taken, otherwise process 800 passes to step 816. If any such numbers are missing, they are used at step 814 to identify frames that may be missing and can therefore lead to incorrect decoding of the video stream. Optionally at step 814 the decoder can signal the lost or corrupted reference pictures to the encoder, for example through external back-channel messages. The encoder can re-send lost packets associated with the reference pictures and/or not use the lost or corrupted pictures for prediction. At step 816, the branch to step 818 is taken if there are picture numbers in the second list that are not in the first list. If any such numbers are missing, they can indicate a reference picture that is no longer needed for prediction. The decoder can mark these buffers with non-included pic_id values as "unused for reference," e.g., using a flag, in step 818. As a result, they can be freed up to store another reference picture. Following step 814, step 816 or step 818, process 800 ends.

An example of decoding an encoded video stream (bitstream) to extract a picture list can start by using the encoded picture list above, that is, encoded_pic_list[ ]=[011, 010, 00100, 1, 1, 00101, 010, 101, 010]. The steps are as follows.
1) Decode bitstream to extract Nlist=6.
2) Compute Nlength=3 from the number of entries in encoded_pic_list[ ]−Nlist.
3) Decode bitstream to get reorder_length '010'=2 at position Nlist+1 in the encoded bitstream.
4) Decode bitstream to get reorder_index array [101, 010]=[5, 2] based on reorder_length and Nlength.
5) Decode bitstream to get the pulse code modulated picture number list:

pic_list_pcm[ ]=[011,010,00100,1,1,00101]=[2,1,3,0, 0,4].

6) Construct pic_list[ ] according to:

pic_list[0]=pic_list_pcm[0]=2;

pic_list[1]=pic_list[0]+pic_list_pcm[1]+1=2+1+1=4;

pic_list[2]=pic_list[1]+pic_list_pcm[2]+1=4+3+1=8;

pic_list[3]=pic_list[2]+pic_list_pcm[3]+1=8+0+1=9;

pic_list[4]=pic_list[3]+pic_list_pcm[4]+1=9+0+1=10; and pic_list[5]=pic_list[4]+pic_list_pcm[5]+1=10+4+ 1=15.

7) Construct reorder_list[ ] according to:

[pic_list[reorder_index[0],pic_list[reorder_index[1]]= [pic_list[5],pic_list[2]]=[15,8].

According to the teachings herein, relatively unique picture numbers can be assigned to reference frames to permit correct encoding and decoding of frames of the video stream. A number of buffers or storage locations are available to store the reference frames. A list of picture numbers (i.e., a reference picture list) can be generated and ranked for encoding. It is also possible to keep track of the picture numbers of reference frames more often used to encode or decode frames and to re-order the picture numbers using the index of the picture list for transmission or storage.

Transmitting or storing the reference picture list along with the encoded frames to be read by the decoder can permit the decoder to compare the received reference picture list with the picture numbers associated with the picture buffers of the decoder. If a picture number appears in the received picture number list but not in the picture buffers, a reference frame can be considered to be missing. In response, the decoder can initiate an action, such as requesting re-transmission, to restore the missing frame. If a picture number does not appear in the received picture number list, but appears in the picture buffers, it can be assumed that the frame associated with the picture number is no longer needed for decoding. The picture buffer can then be marked as "unused" and freed for other reference pictures.

The aspects and implementations of encoding and decoding described above illustrate some exemplary encoding and decoding techniques. However, it is to be understood that encoding and decoding, as those terms are used in the claims, could mean compression, decompression, transformation or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Implementations of transmitting station 12 and/or receiving station 30 (and the algorithms, methods, instructions, etc. stored thereon and/or executed thereby, including by encoder 70 and decoder 100) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer or general purpose processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a video conferencing system. Alternatively, transmitting station 12 can be implemented on a server and receiving station 30 can be implemented on a device separate from the server, such as a hand-held communications device. In this instance, transmitting station 12 can encode content using encoder 70 into an encoded video signal and transmit the encoded video signal to the communications device. In turn, the communications device can then decode the encoded video signal using decoder 100. Alternatively, the communications device can decode content stored locally on the communications device, for example, content that was not transmitted by transmitting station 12. Other suitable transmitting station 12 and receiving station 30 implementation schemes are available. For example, receiving station 30 can be a generally stationary personal computer rather than a portable communications device and/or a device including encoder 70 may also include decoder 100.

Further, all or a portion of embodiments of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding an encoded video stream having a plurality of frames, comprising:
   receiving the encoded video stream, the encoded video stream including a reference picture list, the reference picture list comprising first picture numbers, a number of re-mapped picture numbers, and a plurality of indexes of re-mapped picture numbers, wherein the first picture numbers were re-mapped to encode more often used picture numbers with small numbers within the reference picture list, and wherein the plurality of indexes of re-mapped picture numbers is equal in number to the number of re-mapped picture numbers;
   decoding the reference picture list to obtain first picture numbers included in the reference picture list, each first picture number assigned to a respective reference frame;
   decoding the number of re-mapped picture numbers;
   decoding the plurality of indexes of re-mapped picture numbers;
   constructing a reorder list using the plurality of indexes of re-mapped picture numbers as indexes into the reference picture list;
   identifying second picture numbers assigned to reference frames of reference picture buffers;
   comparing the first picture numbers with the second picture numbers;
   if a picture number is included in the first picture numbers and not included in the second picture numbers, identifying a reference frame to which the picture number was assigned as a missing reference frame and transmitting to an encoder used to encode the encoded video stream a request for the missing reference frame;
   if a picture number is included in the second picture numbers and not included in the first picture numbers, identifying a reference buffer that included a reference frame to which the picture number was assigned as unused for reference; and
   decoding a frame of the plurality of frames using at least one reference frame identified in the reference picture list and the reorder list.

2. The method of claim 1 wherein the picture numbers were encoded using a variable-length code.

3. The method of claim 2 wherein the variable-length code is an Exponential Golomb coding.

4. The method of claim 1 wherein the first picture numbers were encoded using pulse code modulation.

5. An apparatus for decoding an encoded video stream having a plurality of frames, comprising:
   a memory;
   a processor configured to execute instructions stored in the memory to:
   receive the encoded video stream, the encoded video stream including a reference picture list, the reference picture list comprising first picture numbers, a number of re-mapped picture numbers, and a plurality of indexes of re-mapped picture numbers, wherein the first picture numbers were re-mapped to encode more often used picture numbers with small numbers within the reference picture list, and wherein the plurality of indexes of re-mapped picture numbers is equal in number to the number of re-mapped picture numbers;
   decode the reference picture list to obtain first picture numbers included in the reference picture list, each first picture number assigned to a respective reference frame;
   decode the number of re-mapped picture numbers;
   decode the plurality of indexes of re-mapped picture numbers;
   construct a reorder list using the plurality of indexes of re-mapped picture numbers as indexes into the reference picture list;
   identify second picture numbers assigned to reference frames of reference picture buffers;
   compare the first picture numbers with the second picture numbers;
   if a picture number is included in the first picture numbers and not included in the second picture numbers, identifying a reference frame to which the picture number was assigned as a missing reference frame and transmitting to an encoder used to encode the encoded video stream a request for the missing reference frame;
   if a picture number is included in the second picture numbers and not included in the first picture numbers, identifying a reference buffer that includes a reference frame to which the picture number was assigned as unused for reference; and
   decode a frame of the plurality of frames using at least one reference frame identified in the reference picture list and the reorder list.

6. The apparatus of claim 5 wherein the picture numbers were encoded using a variable length code.

7. The apparatus of claim 6 wherein the first picture numbers were encoded using an Exponential Golomb coding.

* * * * *